Figure 1:
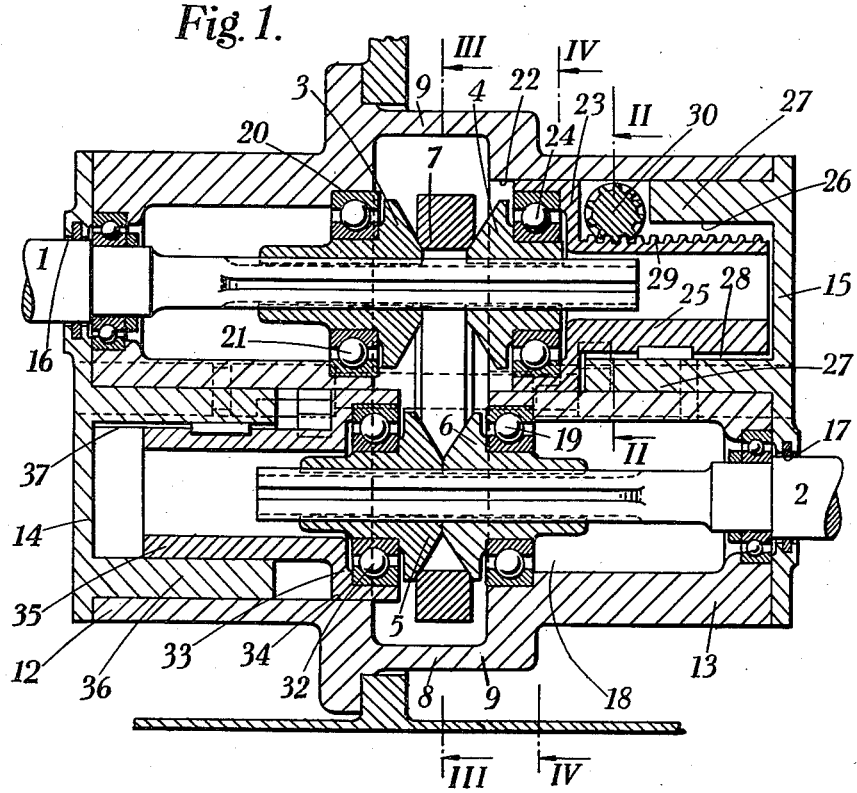

Feb. 25, 1936.     D. H. HEYNAU     2,032,015
FRICTION GEAR TRANSMISSION
Filed Jan. 9, 1935     2 Sheets-Sheet 1

INVENTOR
David Hans Heynau
BY
S. Evrat
ATTORNEY

Feb. 25, 1936.  D. H. HEYNAU  2,032,015
FRICTION GEAR TRANSMISSION
Filed Jan. 9, 1935  2 Sheets-Sheet 2

INVENTOR
David Hans Heynau
BY
ATTORNEY

Patented Feb. 25, 1936

2,032,015

UNITED STATES PATENT OFFICE 2,032,015

FRICTION GEAR TRANSMISSION

David Hans Heynau, London, England

Application January 9, 1935, Serial No. 1,015
In Germany November 9, 1934

4 Claims. (Cl. 74—193)

This invention relates to improvements in mechanism for changing the speed of rotation of a driven shaft relative to that of a driving shaft, of the type in which a pair of bevel members or discs are mounted on each shaft for rotation therewith and a rigid ring is used for transmitting motion from one pair of discs to the other. Change of rotation is obtained by varying the position of the ring with relation to the centres of rotation of the discs by shifting two or all of the discs axially and thereby varying the distances of the discs of each pair. A device of this character in which peripheral pressure is exerted by one pair of discs on the other pair, thereby to resist radial thrust on the shafts due to the action of the motion-transmitting ring, is described in my prior U. S. A. Patent No. 1,950,675.

The principal object of the invention is to provide an improved construction in which the discs are mounted in bores of the casing of the gear to avoid any radial thrust on the shafts.

Other features of the invention will be described with reference to the drawings accompanying this specification and pointed out in the claims.

Figure 2:
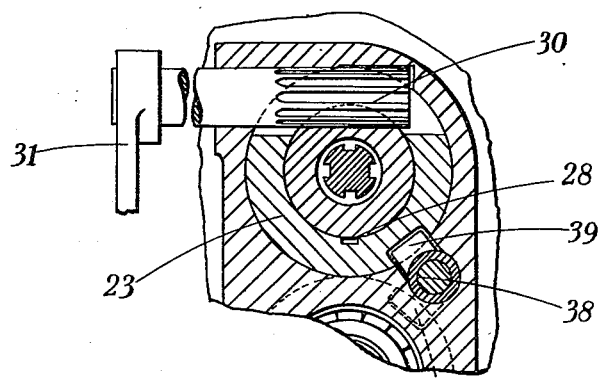
Figure 3:
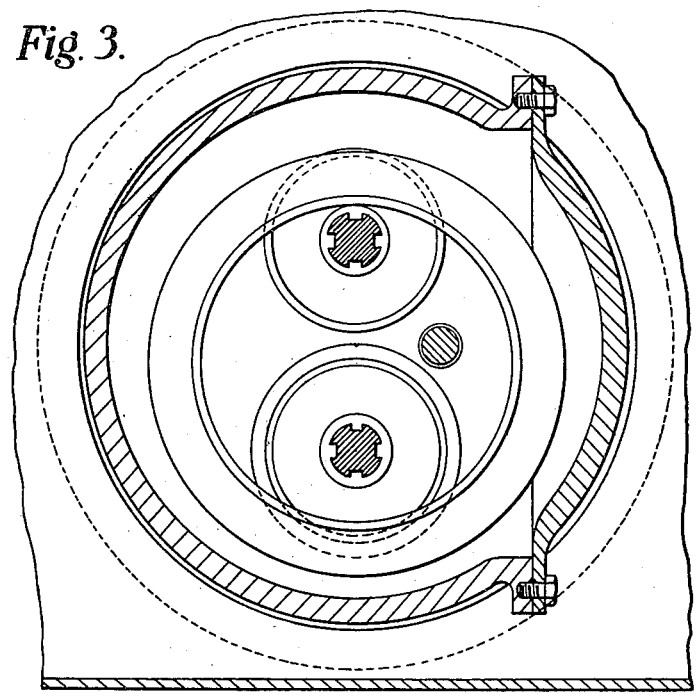
Figure 4:
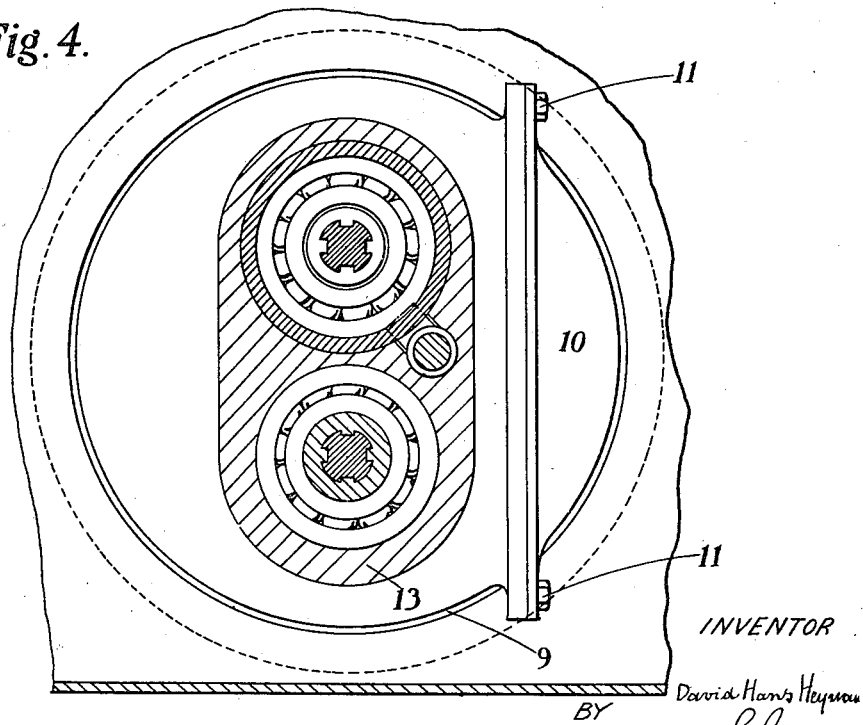

In the drawings:

Fig. 1 is a sectional elevation of a device embodying the features of the present invention, Fig. 2 is a frictional cross section on line II—II of Fig. 1, Fig. 3 is a cross section on line III—III of Fig. 1, and Fig. 4 is a cross section on line IV—IV of Fig. 1.

1 is the main or driving shaft with the pair of bevel discs 3, 4, and 2 is the driven shaft with the pair of bevel discs 5, 6. All the bevel discs are non-rotatably mounted upon their shafts. 7 indicates a rigid friction ring connecting the two pairs of bevel discs and adapted to transmit motion from one pair of discs to the other. 8 designates the gear casing as a whole, said gear casing having a central portion 9 of cylindrical shape which is accessible from the outside by being provided with a cover 10 fixed by screws 11. The two end portions of the casing are designated by the numerals 12 and 13 and have elongated cross sections bounded by two semi-circles and straight vertical lines, as clearly shown in Fig. 4. The casing therefore has a main casing block comprising the portions 9, 12 and 13 and preferably cast in one piece. The casing 8 is closed at the two ends by means of removable covers 14 and 15, the cover 14 having a bore 16 for the reception of the shaft 1 and the cover 15 having a bore 17 for the reception of the shaft 2. The portion 13 of the casing has a circular bore 18 in which is mounted the bevel disc 6 by means of a ball bearing 19. The casing portion 12 has a similar circular bore 20 in which is mounted the bevel disc 3 by means of a ball bearing 21. The bevel disc 4 is mounted by means of a ball bearing 24 in a slide having a portion 23 of large diameter slidably mounted in a circular bore 22 of the casing portion 13, and also a portion 25 at the right hand side of the ball bearing 24 which is of smaller diameter than the portion 23 and is guided in the cylindrical bore 26 of a tubular portion 27 of the cover 15. This tubular portion 27 may be integral with the cover 15 or may be made separately therefrom and fixed thereto by screw bolts so as to form a rigid unit with the cover 15. The sum of the axial length of the portions 23 and 25 of the slide should be at least equal to the diameter of the slide portion 23, and the axial length of the slide portion 25 should preferably be considerably larger than the diameter of this portion. Rotation of the slide 23, 25 in the casing is prevented by a key and groove connection 28 between the reduced portion 25 of the slide and the tubular portion 27. The portion 25 of the slide is formed at the top with a toothed rack 29 meshing with a pinion 30 rotatably mounted in the casing and adapted to be turned from the outside by means of a handle 31. By rotating the handle 31 the slide 23 together with the ball bearing 24 of the bevel disc 4 can be moved axially along the shaft 1 towards and from the bevel disc 3. The bevel disc 5 is in a similar manner mounted by means of a ball bearing 32 in a slide having a portion 33 guided in a bore 34 of the left hand portion 12 of the casing and a reduced portion 35 of smaller diameter guided in a tubular member 36 which is either integral with or fixedly secured to the left hand cover 14. Rotation of the slide 33, 35 is again prevented by means of a groove and feather connection 37. The slides 33, 35 and 23, 25 are connected for axial movement by means of a rod 38 longitudinally slidable in the casing, said rod carrying an arm 39 which engages the slide 23 and an arm 40 which engages the slide 33. The arms 39 and 40 are fixed or are adjustably fixable to the rod 38. When the slide 23, 25 carrying the bevel disc 4 is shifted axially by turning the pinion 30, the other movable slide 33, 35 with the bevel disc 5 will be moved in the same direction and by exactly the same distance.

The considerable axial length of the slides 23, 25 and 33, 35 avoids any possibility of the slides becoming jammed in their guideways. It will also be seen that the length of the hubs of the discs 3, 5 and 6 and even that of the disc 4 is very considerable in order to obtain a very wide bearing for the shafts. The shafts are supported within the bevel discs and are entirely relieved from any radial pressure, the radial pressures being entirely taken up by the casing. As the radial pressures upon the bearings 21 and 32 on the one hand and on the bearings 24 and 19 on the other hand act almost in the same vertical plane, they balance each other almost entirely.

On shifting the bevel disc 4 from the extreme right hand position to the left and simultaneously shifting the bevel disc 5 from its extreme right hand position by the same amount to the left, the distance between the bevel discs 3 and 4 will be reduced, and the distance between the bevel discs 5 and 6 will be increased by the same amount and consequently the motion-transmitting rigid ring 7 will be shifted and the ratio of transmission from one shaft to the other will be varied.

It will be understood that the bevel discs 4 and 5 instead of being longitudinally stationary in the casing might, if preferred, be mounted in the same manner as the bevel discs 3 and 6 namely by being longitudinally slidable in the casing.

I claim:—

1. A speed changing mechanism comprising in combination: a casing having a main casing block with bores; a driving shaft and a driven shaft; a pair of bevel discs mounted on each of said shafts for rotation therewith, one disc of each pair being movable axially towards and from the other disc of the same pair; a rigid friction ring engaging the bevelled portion of both pairs of discs for transmitting motion from one pair to the other; means for shifting said movable discs thereby to vary the position of said ring with relation to the centres of rotation of the discs, and means for transmitting radial pressure from said discs directly to the casing, said means consisting of bearings which carry directly said discs and are all borne in the said bores of the said casing block, substantially as described.

2. A speed changing mechanism comprising in combination: a casing having a main casing block provided with bores; a driving shaft and a driven shaft; a pair of bevel discs mounted on each of said shafts for rotation therewith, one disc of each pair being movable axially towards and from the other disc of the same pair; a rigid friction ring engaging the bevelled portion of both pairs of discs for transmitting motion from one pair to the other; means for shifting said movable discs thereby to vary the position of said ring with relation to the centres of rotation of the discs; and means for transmitting radial pressure from said discs directly to the casing, said means comprising bearings which carry directly said disc and are borne in bores of the said casing block, one pair of said bearings being mounted directly in the bores of the casing block and the other pair of said bearings being mounted in slides which are axially movable and borne in bores of said casing block.

3. A speed changing mechanism comprising in combination: a casing having a main casing block formed with bores; a driving shaft and a driven shaft; a pair of bevel discs mounted on each of said shafts for rotation therewith, one disc of each pair being movable axially towards and from the other disc of the same pair; a rigid friction ring engaging the bevelled portion of both pairs of discs for transmitting motion from one pair to the other; means for shifting said movable discs thereby to vary the position of said ring with relation to the centres of rotation of the discs; and means for transmitting radial pressure from said discs directly to the casing, said means comprising bearings which carry directly said discs and are borne in bores of the said casing block, one pair of said bearings being mounted directly in said bores of the said casing block and the other pair of said bearings being mounted in slides which are axially movable and borne in bores of said casing block, said slides having an axial length at least equal to their maximum outer diameter.

4. A speed changing mechanism comprising in combination: a casing having a main casing block provided with bores; a driving shaft and a driven shaft; a pair of bevel discs mounted on each of said shafts for rotation therewith, one disc of each pair being movable axially towards and from the other disc of the same pair; a rigid friction ring engaging the bevelled portion of both pairs of discs for transmitting motion from one pair to the other; means for shifting said movable discs thereby to vary the position of said ring with relation to the centres of rotation of the discs; and means for transmitting radial pressure from said discs directly to the casing, said means comprising bearings which carry directly said discs and are mounted and borne in said bores of the casing block, one pair of said bearings being mounted directly in said bores of the said casing block and the other pair of bearings being directly mounted in slides which are axially movable in and are borne in the said bores of said casing block, said slides having a portion of large diameter receiving the ball bearings and a reduced portion of smaller diameter outside the bearings, said reduced portion having an axial length exceeding the outer diameter of said portion, substantially as described.

DAVID HANS HEYNAU.